Jan. 15, 1957 W. O. BEYER 2,777,715
FLANGE COUPLING WITH SEALING MEANS RESPONSIVE
TO INTERNAL OR EXTERNAL PRESSURE
Filed June 24, 1952
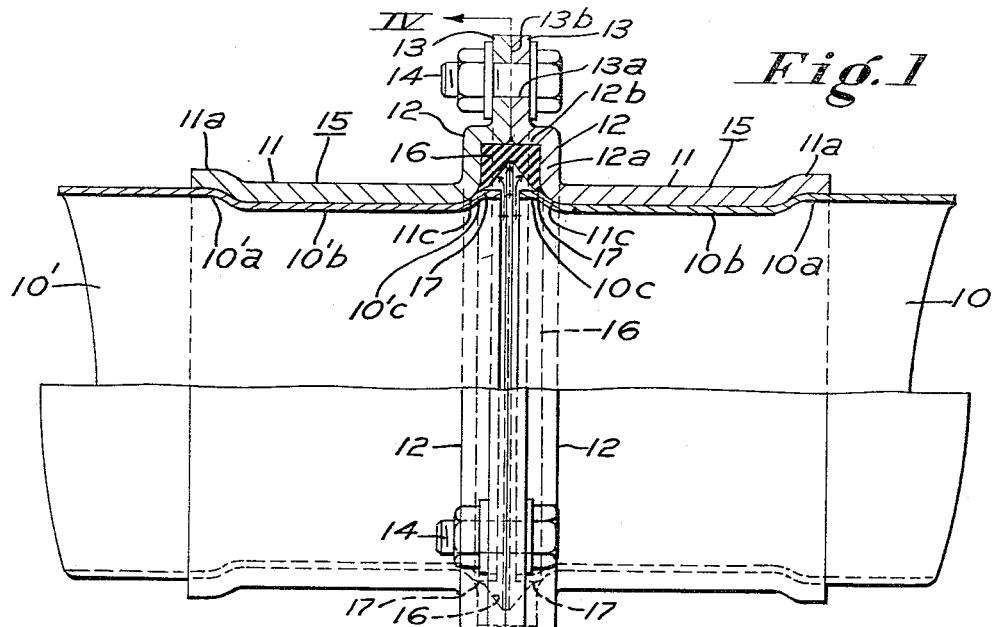
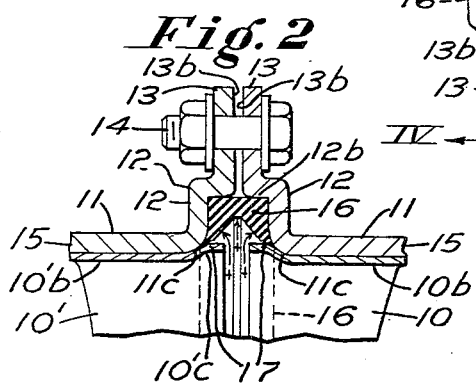
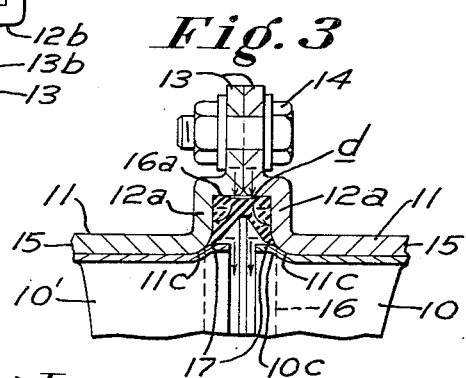
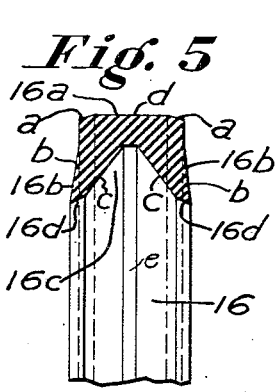
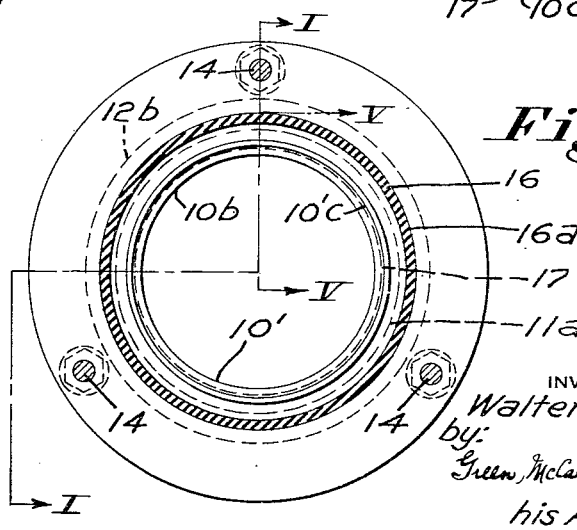
INVENTOR
Walter O. Beyer
by:
Green, McCallister & Miller
his Attorneys.

United States Patent Office 2,777,715
Patented Jan. 15, 1957

2,777,715

FLANGE COUPLING WITH SEALING MEANS RESPONSIVE TO INTERNAL OR EXTERNAL PRESSURE

Walter O. Beyer, Pittsburgh, Pa.

Application June 24, 1952, Serial No. 295,317

2 Claims. (Cl. 285—112)

This invention relates to a new and improved flange type of fluid coupling suitable for providing a fully and effectively sealed-off joint between a pair of fluid-carrying tubing or pipe members or between a fluid-carrying tubing or pipe member and a closed-end tubing or pipe section.

An important phase of my invention relates to a coupling of the type involved, whose fluid sealing-off action is not dependent on a mechanical squeezing-out and clamping action of its coupling body parts upon its gasket, but whose sealing-off action is proportioned to and dependent upon force exerted internally of its gasket by fluid being carried by the coupling.

Another important phase of my invention relates to a coupling of the type involved which will effectively seal-off fluid under positive pressure flow, and without leakage, will continue to effectively seal-off the fluid under negative pressure surges or flow.

Previous to my invention, it has been customary to seal-off a flange type of coupling by applying squeezing-out or compressive force to a gasket by means of a substantially uniformly-applied clamping action imparted thereto by accurately machined, opposed flanges. To obtain an effective seal between a pair of coupling parts, it was found necessary to employ a flowable gasket material, such as rubber or a soft metal, and to force such material along and between the joint to be sealed-off by the application of a relatively high clamping force. For relatively high pressure applications, a non-flowable gasket, such as one of fibrous material, has not been satisfactory because of its inability to be mechanically squeezed into and along the joint.

In carrying fluid such as liquids and gases in a pipe line system, I found that it is advantageous to employ tubing members and coupling body parts of as light a wall construction as possible. One of the important considerations in this connection is initial cost and another and very important consideration is the weight involved in carrying and assembling the individual members. In such a system, I have determined that even where the primary desideratum is to carry fluids under pressure, that the system, even under such conditions, may be subjected to periodical line surges during the pumping action, such that suction forces are set up within the coupling body. In addition, it is often desirable to apply negative or suction pressure force in the system as, for example, when it is to be cleaned out or flushed.

In further evaluating the problem involved in providing a practical coupling for the purpose outlined which will effectively operate under both positive and negative fluid pressure forces and particularly, where a reversal of force action occurs within the system during its utilization at a given installation, I found that certain factors had to be met. At this point, it should be noted that I found that the present day type of coupling construction has not been fully satisfactory.

In the first place, the gasket-clamping type of action more or less inherently requires a relatively heavy coupling body, such as a cast body, and a high accuracy of abutting surfaces to obtain a uniform sealing action about the coupling and avoid leakage at localized areas or points. In the second place, the high pressure to which the gasket material is subjected to squeeze it out between its flanges to effect the sealing action, limits the life of such material or the period of its utilization. Under conditions where the fluid is of a type that tends to deteriorate the gasket material, such deterioration was found to be rapidly increased and made much more effective, due to the high mechanical pressure to which the gasket material was continuously subjected.

Soft metal gasket materials were found to be disadvantageous, in that their sealing action was not as good as rubber-like materials, and due to the fact that greater difficulty was encountered in separating the body parts of the coupling after they have been once assembled. Ordinarily in such a case, the coupling could be used only once and thus, was not adaptable to periodical dismantling, as when the pipe or tubing members were to be moved from one location to another. When rubber-like gasket material is used, it has to be frequently replaced due to the fatigue imparted to it by the continuous high mechanical clamping forces which also make it more sensitive to temperature variations.

Contrary to the previous approach to the problem, I have found that its solution does not rest as importantly upon the selection of a better type of gasket material as upon the actual way in which the gasket material is used in accomplishing the sealing-off action. In arriving at my new approach to the problem, I discovered that the problem was made more complex by the fact that the coupling should be effective, or in other words, should not leak, even when the fluid system is subjected to negative or oscillating positive and negative forces during its utilization. Thus, an important factor is involved in providing a coupling which, even though capable of standing relatively high positive pressures without leakage, will at the same time, withstand negative pressures or variations between the two, without leakage. I have discovered that it is important to fit the gasket within the coupling in such a manner as to insure that it will always (without a mechanical squeezing-out action) be in a proper working position therein. As above intimated, the coupling should also be of a type that will make possible the utilization of a relatively light wall coupling and pipe member construction and which will further permit the system to be dismantled and reused at a number of different locations.

Another phase of the problem relates to the previous need for a relatively heavy coupling body to provide geometrically-symmetrical, cooperating planar surfaces for its flanges.

It has thus been an object of my invention to provide a new and improved form of flange coupling which will solve the problem presented in this particular art;

Another object of my invention has been to develop a new principle of operation and to embody it in a practical coupling body construction wherein, the fluid sealing-off action of its gasket will be substantially independent of the mechanical holding action of its flanges for maintaining a joint between tubing or pipe members;

A further object of my invention has been to provide a practical and effective coupling suitable for frequent change installations which will withstand high fluid pressures, will be effective under negative pressures, and will have a long and useful life;

These and many other objects of my invention will appear to those skilled in the art from the following description thereof.

In the drawings,

Figure 1 is a side sectional view in elevation through a coupling of my invention showing its body parts in a mechanically secured relationship; in this figure, (+) sign arrows are employed to indicate the application of positive fluid pressure;

Figure 2 is a fragmental section of an upper half of the construction of Figure 1 showing the coupling body in a slightly separated relationship as representing a spaced relation between its flanges before they are finally tightened-up together or as representing a departure of its flanges from a common geometrical plane;

Figure 3 is a fragmental section with the coupling parts bolted together, as shown in Figure 1, but illustrating by (—) sign arrows, the application of negative fluid pressure;

Figure 4 is an end section in elevation taken along the line IV—IV of Figure 1;

Figure 5 is a fragmental side section showing the construction of a gasket employed in the coupling of Figure 1.

Referring particularly to Figure 1 of the drawings, I have shown a pair of opposed tubing or pipe end portions 10 and 10' which represent end portions of tubing members that are to be coupled together in a pipe line system, or of a tubing member and a closed end portion for shutting or closing off an end of a system. The coupling construction employs similar or complementary coupling body parts 15. Each coupling body part 15 has a sleeve portion 11, a gasket-receiving or extension portion 12, and a flange portion 13.

The tubing end portion 10 (or 10') is shown securely positioned within the sleeve portion 11 by a pair of longitudinally spaced-apart, interengaging, latching shoulders or offsets. An outer shoulder 11a at the outer end of the sleeve portion 11 is offset transversely or radially-outwardly and defines an inner valley or groove within which a like offset or shoulder 10a of the tubing portion is engaged. It will be noted that the diameter 10b of the light wall tubing end portion 10 is reduced from the shoulder 10a and extends longitudinally along the sleeve portion 11 (has a press fit) to terminate in a shoulder portion 10c which engages and is bent upwardly along a corresponding shoulder 11c of the sleeve portion 11. The shoulder portion 11c is defined by an integral connection between the sleeve portion 11 and the gasket-receiving portion 12. In this manner, the tubing or pipe end portion 10 is effectively located and secured within the sleeve portion 11 of the coupling body part by spaced-apart, interengaging, locking shoulders and by the intermediate extent of the portion 10b which is reduced into the sleeve portion 11.

The gasket-receiving portion 12 of the body part 15, like the sleeve portion 11, and the flange portion 13, defines a continuous wall about the tubing end portion 10 (or 10'). A side wall 12a of the portion 12 extends transversely or radially-outwardly from the inner end of the sleeve portion 11 and is integrally connected to a longitudinal-inwardly extending back wall 12b to define a half of a gasket-receiving or backup chamber which is also offset longitudinally-outwardly from the flange portion 13. The latter portion 13 is integrally connected to the inner end of the back wall 12b to extend transversely or radially-outwardly therefrom. The flange portion 13 has a series of holes 13a therethrough (three are shown in Figure 4) for receiving bolt and nut assemblies 14, as shown in Figures 1 and 4.

The flange portion 13 extends transversely or radially-outwardly from the gasket receiving portion 12 and its interface 13b is adapted to be placed in a mechanically clamped relationship or abutment with a like face of the flange portion 13 of the other body part 15. It will be noted at this point that the opposed faces 13b of the flange portions 13 do not have to be accurately machined, since they accomplish no sealing action in themselves. Further, a minimum number of bolt and nut assemblies 14 are needed, since their clamping action is totally a mechanical action for the pipe or tubing members, and it is not necessary to provide an equally distributed and substantially uniform clamping pressure about the flange portions 13 and a uniform squeezing-out flow of the gasket material between the flange portions. In other words, smooth, geometrically-symmetrical, or planar surfaces are no longer needed at the opposed flange areas (old fluid-sealing areas), but in my construction, may depart from geometrical planes. This is an important factor in simplifying the fabrication of the coupling body parts and in materially reducing their weight requirements. In actual practice, I have found that as great as a 1/16 inch irregularity between the opposed faces of the flange portions 13 has no adverse effect on the sealing-off action of the coupling (see the relationship of Figure 2, for example). A larger, localized, clearance area is not desired, as there may be a tendency for the base portion of a gasket 16 to flow into such area.

As shown particularly in Figure 5, I employ a resilient gasket 16 of rubber-like material having the property of elasticity and non-compressibility which has a base portion 16a and a pair of side wall or skirt portions 16b that define a fluid-force-sensitive fluid chamber 16c therein. The gasket 16 is a continuous or annular extent. For best results, I prefer to bevel outer edges a of the base 16a, flare the side walls 16b outwardly at b, and scarf a pair of inner feather edges or rims 16d. In this connection, each edge 16d is shown as having about a 60° angle with respect to the face b of the corresponding side wall portion 16b, and an outer flare with respect to a chamber defining face c.

As illustrated in Figures 1, 2 and 3, the feather edges or rims 16d of the gasket 16 contact upon or abut against a supporting ledge 17 which projects slightly longitudinally inwardly from each of the sleeve portions 11. As shown, the supporting ledges 17 may be provided by a longitudinally-extending end of the tubing portion 10 (or 10') which is integral with the terminal end of the shoulder portion 10c. The gasket 16 has a radial or transverse depth in the direction of its chamber 16c, as defined by the V- or U-shape of the faces c, such that it is held with a slight friction fit (when no fluid pressure is being exerted) in a radial direction between the continuous ledges 17 and the back walls 12b of the coupling body parts 15.

It will be further noted that the coupling body parts 15, when drawn up by the bolt and nut assemblies 14, so that their flange portions 13 are in a secure mechanical engagement with each other, define a three-sided, continuous, gasket-receiving or backing-up chamber or pocket which is, in effect, partially four-sided when taken with the ledges 17. However, the ledges 17 define a longitudinally-open spacing therebetween substantially larger than (about twice) the full width of the base portion of the chamber 16c of the gasket, so that the latter is at all times fully open to the fluid being carried by the coupling and the tubing members. A transverse or radial plane representing the joint or cleavage between the opposed faces of the flange portions 13, extends through the center of such open, annular spacing.

As shown in the figures, the elastic edge end of the gasket rim portion 16d is adapted to snap-fit into a slight, annular groove defined between the shoulder 10c (or the ledge portion 17) and the shoulder or bend 11c of the sleeve portion 11. That is, the radial depth extent of the side wall portions 16b of the gasket (through the base portion 16a) is such as to provide it with a close slide-over fit within the gasket-receiving portion 12 that is without distortion of its sealing rim portion 16d in its final position, such that an effective sealing contact will not be prevented, but such that the gasket can be easily mounted and dismounted within the coupling body parts 15 with a close fit, and such that it will always be in a proper working position within the coupling body parts (regardless of the type of fluid force being applied). Each side wall portion 16b being of a depth sufficient to give the annular edge of its rim portion 16d an elastic (tension) fit upon the ledge portion 17, such that it expands into or latches within the slight V defined by the above-mentioned groove.

As shown particularly in Figure 1, the application of positive fluid pressure, as indicated by the arrows (+), will cause an outward flexing or expansion of the elastic gasket 16 and a tendency for the beveled outer edges a of its base portion 16 to abut against the back walls 12b. There is thus a highly effective sealing-off action that is directly dependent upon the force or pressure of the fluid medium being carried and which acts upon three continuous surfaces of the gasket (side and back). This is true also when, as shown in Figure 2, there may be a slight deviation in the contour of the opposed faces of the flange portions 13, which will not adversely affect their mechanical holding action, but which in a usual type of coupling would produce leakage paths at localized areas of the gasket.

On the other hand, when a suction force is applied, as indicated by the other arrows (−) of Figure 3, there will be a slight cupping (the amount depending upon the quantity of such force) along a central line area d of the base portion 16a of the gasket which will also cause the edges a to closely abut against the side walls of the backing-up chamber, and which causes the side wall portions 16b to also closely abut such side walls and continue the effective sealing-off action. The ledges 17 are particularly important in this connection in that they confine the side wall portions 16b and the abutting edges or rims 16d of the gasket 16 and prevent it from being sucked out of the backing-up chamber. In both cases, however, there is a fluid-applied expansion force applied to the side wall portions 16b of the gasket which provide an effective sealing action; even reversals in the type of fluid pressure application will not cause a release of such sealing action. In this manner, fluid is always prevented from getting behind the side wall portions 16b and thus, causing leakage.

It will be apparent from the above description that in my coupling, the gasket sealing action is essentially dependent upon the force exerted by the fluid medium being carried in the system, and that the sealing-off action does not depend on any mechanical clamping action upon the gasket and require highly machined, accurate, planar interface, flange surfaces. Even when there is a very slight pressure, I have found that the gasket 16 is sealed off by what may be termed capillary action of the fluid. The sealing action is thus divorced or independent of the mechanical holding action and there is no permanent distortion of the gasket, such that it tends to lose its "life." It also makes possible, as illustrated, the utilization of light wall tubing and coupling constructions, and facilitates the coupling and uncoupling of the coupling body parts, since a minimum number of bolt assemblies are necessary, and since they are dependent entirely upon the mechanical action required for holding the tubing portins 10 and 10' together. The thus made possible minimizing of the nut and bolt assemblies 14 and of the holes 13a, also provides a stronger flange construction. In employing my coupling, I have used positive pressures of up to 200 lbs. and over and have subjected it to negative pressures of minus 6 to 8 lbs. and over, without any evidence of fluid leakage.

My coupling construction can be very simply made. For example, in making the body parts 15, I start with a flat plate and punch-draw it into a cylindrical shape having open ends, one of which is flanged (corresponding to shoulder 11a). I then reverse and position such ylindrical shape over a stepped female die and press-out the portions 12 and 13. The two shoulders 10a and 10c of the tubing 10 are pressed into the sleeve portion 11 of the flange body 15. This provides a press fit, since the normal outer diameter of the tube 10 is greater than the inner diameter of the portion 11b of the sleeve portion 11 of the flange body, for example, in the order of .010 to .025 inch. I thus simultaneously force the tubing end 10 (contract the portion 10b) into the sleeve portion 11 and form the shoulders 10a and 10c by an expanding operation. In this connection, by way of example, I have successfully used, 4 inch diameter (sheet metal) tubing of 16 gauge material (1/16 of an inch in thickness) and sheet metal coupling body parts of 11 gauge material (1/8 of an inch in thickness) for ordinary service pressures of about 100 to 150 p. s. i. In general, 16 gauge tubing and a 10 to 13 gauge coupling body have been found to be satisfactory for pressures of up to about 400 p. s. i. for a 4 inch diameter flow. Plastic and glass materials have also been used.

In carrying out my invention, I utilize a pair of coupling body parts 15 for mechanically securing tubing end portions 10 and 10' together as a unit of a system. The body parts are so constructed as to define a gasket backing-up chamber within which the chamber gasket 16 will be open (annularly) at all times to the fluid being carried in the system, but backed-up or enclosed by walls of the chamber. Further, I employ a resilient, non-compressible and flowable type of gasket 16, such as of rubber or elastic-like material, but so confine it that it will be retained in its backing-up chamber, under all operating conditions and regardless of whether positive or negative fluid pressure forces are being applied. In this connection, a squeezing-out or plastic flow of the gasket 16 along the joint of the coupling parts is not only not desired, but is positively prevented. The gasket 16, itself, is provided with a solid base portion 16a which abuts against the backing-up chamber and rests across the joint defined by the flanges 13 of the body parts. The pair of opposite side wall portions or skirts 16b extend transversely or radially-inwardly from its solid base portion 16a, and define the internal V or U-shaped pressure chamber 16c which faces towards and is effectively open to a relatively wide and continuous passageway between the tubing or pipe portions 10 and 10' being coupled.

It will be further noted that the side wall portions 16b of the gasket 16 serve as sealing faces along transverse sides 12a of the coupling body parts 15 which latter are offset longitudinally from a transverse plane of the joint represented by the clamping flange portions 13. The fluid-force-sensitive fluid chamber 16c within the gasket 16 is continuous or annular in its extent and terminates outwardly at its base e in a width area of smaller extent than the continuous or annular fluid passageway spacing between the ledges 17. The ledges 17 are opposed to and transversely spaced inwardly from the back wall portions 12b of the backing-up chamber defined by the body parts 15 of the coupling. The gasket 16 is entered in the gasket-receiving chamber without adverse displacement or distortion, so that it is fully effective in its snapped-in position.

When positive fluid pressure is applied, it directly acts internally upon the gasket 16 through its internal chamber 16c to expand it within the confines of its positioning chamber and in effect, provide a three-wall, fluid-sealing action. When negative fluid pressure is applied, its base portion 16a is drawn in centrally at d in alignment with the flange joint, and the outer edge portions 16a and its side walls 16b are forced outwardly against the backing-up space to continue the sealing-off action without any loss or leakage of fluid. The supporting feather edges or rims 16d cooperate with the base portion 16a to retain the gasket in position, even when the variations in the type of pressure applied are rapid (oscillate).

What I claim is:

1. A flange coupling providing a fluid-pressure-sensitive seal which is effective as to both positive and negative fluid pressure and which has a pair of substantially identical end structures, each end structure comprising a tube end portion of thin section and a one-piece body part of thicker section; each said body part having a longitudinally-extending tubular sleeve portion in secure position about an associated tube end portion, having an annular side wall projecting radially-outwardly from a back end of said sleeve portion, having a tubular back wall projecting longitudinally-backwardly from said side wall and cooperating with the back wall of the other body part to define a plane of cleavage between the pair of end structures, and having a flange wall projecting radially-outwardly from said back wall along the plane of cleavage; means for holding said flange walls of the body parts in a coupled relationship, said side and back walls of the body parts defining a radially-inwardly-open three-sided pocket; each tube end portion having radially-outwardly offset shoulders interlocking with the tubular sleeve portion of an associated body part, and having an annular ledge projecting longitudinally-inwardly of and at a position that is radially-outwardly offset within the pocket; each said ledge defining an annular positioning groove with the side wall of the associated body part, each said groove being radially-inwardly offset with respect to its associated ledge, a fluid pressure-sensitive resilient annular gasket of substantially V-section, said ledges being longitudinally spaced-apart when said flange walls are secured together to define a substantially four-sided pocket having a fluid-receiving annular passageway on its inner side along the plane of cleavage, said gasket being securely positioned inside the four-sided pocket with its base along a back wall of the four-sided pocket without tightening-down said flange walls by said means, said gasket having a pair of side legs along side walls of the four-sided pocket, said side legs having a greater length than the radial depth of the four-sided pocket to provide an elastic latching-snap fit within said grooves due to the radially-inwardly offset relation of the grooves with respect to said ledges; and said gasket being securely held in position at its base and side legs between the back wall of the four-sided pocket and said grooves, to expand outwardly against the side and back walls of the pocket upon an application of positive fluid pressure, and to contract inwardly from its base along the plane of cleavage from the back wall of and expand outwardly along side portions of the back wall and along the side walls of the four-sided pocket upon an application of negative fluid pressure.

2. A coupling as defined in claim 1 wherein outer corner edges of the base of said gasket are beveled, its side legs are outwardly-flared sidewise, and its side legs terminate in radially-inner feather edges that outwardly-flare sidewise.

References Cited in the file of this patent

UNITED STATES PATENTS

| | | |
|---|---|---|
| 255,523 | Lightburne | Mar. 28, 1882 |
| 700,798 | Morris | May 27, 1902 |
| 1,339,636 | Tulloch | May 11, 1920 |
| 1,526,959 | Brownell | Feb. 17, 1925 |
| 2,703,722 | Christophersen | Mar. 8, 1955 |

FOREIGN PATENTS

| | | |
|---|---|---|
| 12,808 | Great Britain | May 29, 1911 |
| 400,060 | Great Britain | Oct. 19, 1933 |